US011319856B2

(12) United States Patent
Ito et al.

(10) Patent No.: US 11,319,856 B2
(45) Date of Patent: May 3, 2022

(54) CONTROL DEVICE CONTROLLING $CO_2$ RECOVERY DEVICE

(71) Applicant: TOYOTA JIDOSHA KABUSHIKI KAISHA, Toyota (JP)

(72) Inventors: Masaki Ito, Toyota (JP); Sakiko Yoshida, Mishima (JP); Hiroki Murata, Gotemba (JP); Kazumasa Okamura, Gotemba (JP); Toshihiro Nakamura, Sunto-gun (JP); Kohei Watanabe, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/024,321

(22) Filed: Sep. 17, 2020

(65) Prior Publication Data

US 2021/0108549 A1   Apr. 15, 2021

(30) Foreign Application Priority Data

Oct. 9, 2019 (JP) .............................. JP2019-186114

(51) Int. Cl.
*F01N 9/00* (2006.01)
*B01D 53/02* (2006.01)
(Continued)

(52) U.S. Cl.
CPC ............... *F01N 9/00* (2013.01); *B01D 53/02* (2013.01); *B01D 53/0438* (2013.01);
(Continued)

(58) Field of Classification Search
CPC ........ F01N 9/00; F01N 3/0205; F01N 3/0857; F01N 3/0871; F01N 2570/10;
(Continued)

(56) References Cited

U.S. PATENT DOCUMENTS

| 10,688,686 B2* | 6/2020 | Fadhel ................... C04B 28/10 |
| 2008/0264514 A1* | 10/2008 | Tessier ................. F17C 11/007 141/4 |
| 2016/0146161 A1* | 5/2016 | Sun ........................ F01N 3/021 60/598 |

FOREIGN PATENT DOCUMENTS

| JP | 2005-327207 A | 11/2005 |
| JP | 2007-136341 A | 6/2007 |

(Continued)

*Primary Examiner* — Brandon D Lee
(74) *Attorney, Agent, or Firm* — Finnegan, Henderson, Farabow, Garrett & Dunner, LLP

(57) ABSTRACT

A vehicle includes a battery and a $CO_2$ recovery device using electric power of the battery to recover $CO_2$ contained in inflowing gas. A control device mounted in the vehicle controls the $CO_2$ recovery device. The control device permits operation of the $CO_2$ recovery device in the case where a high efficiency recovery condition, at which it is predicted that the efficiency of recovery of $CO_2$, showing a ratio of the amount of recovery of $CO_2$ in the $CO_2$ recovery device with respect to the electric power consumed by the battery, will become equal to or greater than a preset predetermined efficiency, is satisfied, and prohibits operation of the $CO_2$ recovery device in the case where the high efficiency recovery condition is not satisfied.

7 Claims, 4 Drawing Sheets

(51) Int. Cl.
  *B01D 53/14* (2006.01)
  *B60R 16/033* (2006.01)
  *F01N 3/02* (2006.01)
  *F01N 3/08* (2006.01)
  *B01D 53/04* (2006.01)
  *F25J 3/06* (2006.01)

(52) U.S. Cl.
  CPC ............ *B01D 53/14* (2013.01); *B60R 16/033* (2013.01); *F01N 3/0205* (2013.01); *F01N 3/0857* (2013.01); *F01N 3/0871* (2013.01); *B01D 2257/504* (2013.01); *B01D 2258/01* (2013.01); *B01D 2259/4566* (2013.01); *F01N 2570/10* (2013.01); *F01N 2900/08* (2013.01); *F01N 2900/1402* (2013.01); *F01N 2900/1621* (2013.01); *F25J 3/067* (2013.01)

(58) Field of Classification Search
  CPC ..... F01N 2900/1402; F01N 2900/1621; F01N 2900/08; F01N 2900/10; B01D 53/0438; B01D 53/02; B01D 53/14; B01D 2257/504; B01D 2259/4566; B01D 2258/01; B01D 53/0454; B60R 16/033; F25J 3/067; Y02C 20/40; Y02T 10/40; Y02T 10/12; G05B 23/0213; C01B 32/50
  See application file for complete search history.

(56) References Cited

FOREIGN PATENT DOCUMENTS

| | | |
|---|---|---|
| JP | 2007-177684 A | 7/2007 |
| JP | 4645447 B | 3/2011 |

* cited by examiner

CONTROL DEVICE CONTROLLING CO$_2$ RECOVERY DEVICE

FIELD

The present disclosure relates to a control device controlling a CO$_2$ recovery device.

BACKGROUND

In the past, technology for recovering CO$_2$ in exhaust gas has been proposed (for example, PTLs 1 to 3). For example, PTL 1 describes a vehicle-mounted type of CO$_2$ recovery device recovering CO$_2$ in the exhaust gas by introducing exhaust gas discharged from an internal combustion engine of a vehicle into a CO$_2$ recovery part. Due to such a configuration, the CO$_2$ recovery device described in PTL 1 reduces the amount of CO$_2$ discharged from the vehicle.

Such a CO$_2$ recovery device is operated using the electric power of a battery mounted in a vehicle for the purpose of optimizing the recovery capacity of CO$_2$ in the CO$_2$ recovery part. For example, in a CO$_2$ recovery device, electric power of the battery is used to cool the CO$_2$ recovery part.

CITATIONS LIST

Patent Literature

[PTL 1] Japanese Patent No. 4645447
[PTL 2] Japanese Unexamined Patent Publication No. 2005-327207
[PTL 3] Japanese Unexamined Patent Publication No. 2007-136341

SUMMARY

Technical Problem

However, in such a CO$_2$ recovery device, if the CO$_2$ recovery device is operated under conditions of a poor recovery efficiency of CO$_2$, sometimes a sufficient amount of recovery of CO$_2$ cannot be obtained with respect to the electric power of the battery consumed by the CO$_2$ recovery device.

In consideration of this problem, an object of the present disclosure is to provide a CO$_2$ recovery device with a large amount of recovery of CO$_2$ with respect to the electric power of the battery consumed by the CO$_2$ recovery device.

Solution to Problem

The gist of the present disclosure is as follows.

(1) A control device which is mounted in a vehicle including a battery and a CO$_2$ recovery device using electric power of the battery to recover CO$_2$ contained in inflowing gas, and which controls the CO$_2$ recovery device, wherein the control device permits operation of the CO$_2$ recovery device in the case where a high efficiency recovery condition, at which it is predicted that the efficiency of recovery of CO$_2$, showing a ratio of the amount of recovery of CO$_2$ in the CO$_2$ recovery device with respect to the electric power consumed by the battery, will become equal to or greater than a preset predetermined efficiency, is satisfied, and prohibits operation of the CO$_2$ recovery device in the case where the high efficiency recovery condition is not satisfied.

(2) The control device according to above (1), wherein the gas flowing into the CO$_2$ recovery device is a gas discharged from an internal combustion engine mounted in the vehicle,
the CO$_2$ recovery device includes:
a CO$_2$ recovery part recovering CO$_2$ in the gas flowing into the CO$_2$ recovery device;
a cooling part using the electric power of the battery to cool the CO$_2$ recovery part; and
a suction part using the electric power of the battery to suck in the gas and make the gas flow to the CO$_2$ recovery part, and
the control device permits operations of the cooling part and suction part if the high efficiency recovery condition is satisfied, and prohibits operations of the cooling part and suction part if the high efficiency recovery condition is not satisfied.

(3) The control device according to above (1) or (2), wherein
the control device:
permits the operation due to the high efficiency recovery condition being satisfied, if it is predicted that the vehicle will be driven by equal to or greater than a predetermined distance; and
prohibits the operation due to the high efficiency recovery condition not being satisfied, if it is predicted that the vehicle will not be driven by equal to or greater than a predetermined distance.

(4) The control device according to any one of above (1) to (3), wherein
the control device:
permits the operation due to the high efficiency recovery condition being satisfied, if a water temperature of the internal combustion engine of the vehicle is equal to or greater than a predetermined temperature; and
prohibits the operation due to the high efficiency recovery condition not being satisfied, if the water temperature is lower than the predetermined temperature.

(5) The control device according to any one of above (1) to (4), wherein
the control device:
permits the operation due to the high efficiency recovery condition being satisfied, if a predetermined time has elapsed from cold start of the internal combustion engine of the vehicle; and
prohibits the operation due to the high efficiency recovery condition not being satisfied, if the predetermined time has not elapsed from cold start.

(6) The control device according to above (1), wherein
the gas flowing into the CO$_2$ recovery device is air around the vehicle,
the CO$_2$ recovery device includes:
a CO$_2$ recovery part recovering CO$_2$ in the gas flowing into the CO$_2$ recovery device; and
a suction part using the electric power of the battery to suck in the gas and make the gas flow to the CO$_2$ recovery part, and
the control device:
permits the operation due to the high efficiency recovery condition being satisfied, if a concentration of CO$_2$ contained in the air around the vehicle is equal to or greater than a predetermined threshold value; and
prohibits the operation due to the high efficiency recovery condition is not satisfied if the concentration of CO$_2$ is lower than the predetermined threshold value.

(7) The control device according to any one of above (1) to (6), wherein the vehicle further includes a user input part receiving an operation prohibit instruction for prohibiting the operation, from the user of the vehicle, and the control part prohibits the operation even when the high efficiency recovery condition is satisfied, if the user input part receives the operation prohibit instruction.

Advantageous Effects of Invention

According to the present disclosure, there is provided a $CO_2$ recovery device with a large amount of recovery of $CO_2$ with respect to the electric power of the battery consumed by the $CO_2$ recovery device.

DESCRIPTION OF EMBODIMENT

Below, embodiments of the present disclosure will be explained in detail with reference to the drawings. Note that, in the following explanation, similar elements will be assigned the same reference notations.

First Embodiment

First, a control device of a $CO_2$ recovery device according to a first embodiment will be explained.

Configuration of Vehicle

Figure 1:
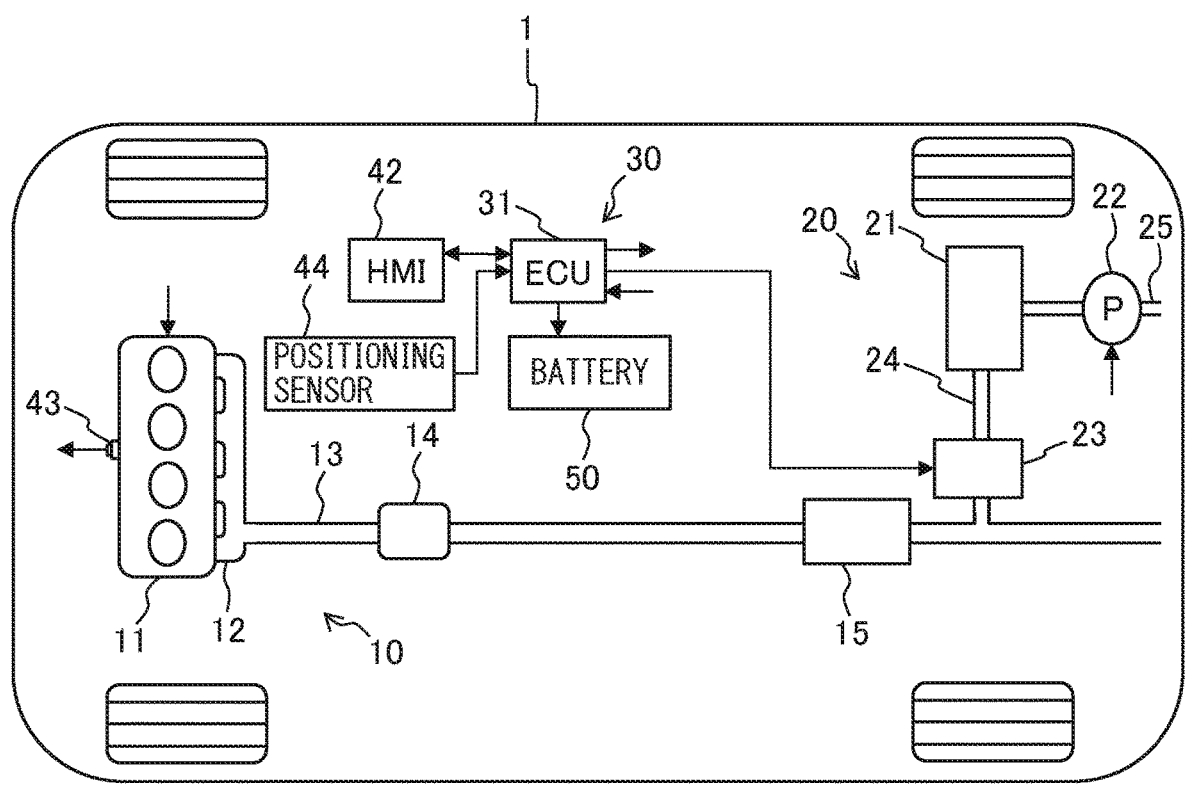
FIG. 1 is a view schematically showing the configuration of a vehicle.

FIG. 1 is a view schematically showing the configuration of a vehicle 1 mounting the control device according to the present embodiment. As shown in FIG. 1, the vehicle 1 includes an internal combustion engine 10 driving the vehicle 1, a $CO_2$ recovery device 20 recovering $CO_2$, a control device 30, and a battery 50. Note that, in the present embodiment, the internal combustion engine 10 is used as the source of power for driving the vehicle 1, but a motor may also be used as the source of power in addition to the internal combustion engine 10.

The internal combustion engine 10 includes an engine body 11, exhaust manifold 12, exhaust pipe 13, exhaust purification device 14, and muffler 15. The engine body 11 is arranged inside an engine compartment formed at a front part of the vehicle 1 (left side of FIG. 1). The exhaust pipe 13 mainly extends below the underbody of the vehicle 1 in the front-back direction of the vehicle 1 from the engine body 11 toward the back part of the vehicle 1. The exhaust purification device 14 and the muffler 15 are provided at the exhaust pipe 13.

The engine body 11 burns fuel at the inside thereof to thereby generate drive force for driving the vehicle 1. The exhaust gas generated by burning fuel in the engine body 11 flows through the exhaust manifold 12 into the exhaust pipe 13.

The exhaust pipe 13 is coupled through the exhaust manifold 12 to the engine body 11. The exhaust gas discharged from the engine body 11 flows through the exhaust manifold 12 and exhaust pipe 13 and is discharged from an outlet of the exhaust pipe 13 into the atmosphere.

The exhaust purification device 14 removes NOx, HC (hydrocarbons), CO, particulate, and other substances in the exhaust gas flowing into the exhaust purification device 14. The exhaust purification device 14 is, for example, a three-way catalyst, NOx storage and reduction type catalyst, or particulate filter. Note that, a plurality of exhaust purification devices 14 may be provided at the exhaust pipe 13.

The muffler 15 lowers the temperature and pressure of the exhaust gas flowing through the exhaust pipe 13 so as to reduce the exhaust noise. The muffler 15 is arranged at the downstream side of the exhaust purification device 14 in the direction of flow of the exhaust gas.

Configuration of $CO_2$ Recovery Device

As shown in FIG. 1, the $CO_2$ recovery device 20 is provided with a $CO_2$ recovery part 21, suction pump 22, and cooling part 23.

As shown in FIG. 1, the $CO_2$ recovery part 21 communicates with the exhaust pipe 13 through the communicating path 24. The $CO_2$ recovery part 21 communicates with the outside of the vehicle through the exhaust passage 25.

The $CO_2$ recovery part 21 is a device for recovering $CO_2$ in the gas supplied to the $CO_2$ recovery part 21 (in the present embodiment, the exhaust gas discharged from the internal combustion engine 10). In the present embodiment, the $CO_2$ recovery part 21 is arranged in a luggage space positioned at the back part of the vehicle 1 or below it. Note that, the $CO_2$ recovery device 20 is a heavy object, therefore is preferably arranged as much as possible at the bottom in the vertical direction in the luggage space.

The method of recovery of the $CO_2$ in the gas by the $CO_2$ recovery part 21 includes, for example, a physical adsorption method, physical absorption method, chemical absorption method, cryogenic separation method, etc.

The physical adsorption method, for example, is the method of bringing activated carbon or zeolite or another solid adsorbent into contact with the gas containing $CO_2$ to thereby make the $CO_2$ be adsorbed at the solid adsorbent and of heating the solid adsorbent (or reducing the pressure around the solid adsorbent) so as to make the $CO_2$ desorb from the solid adsorbent for recovery.

If employing the physical adsorption method, the $CO_2$ recovery part 21 is, for example, configured as a container containing pellet-shaped zeolite. By making the gas containing $CO_2$ flow through this container, $CO_2$ is adsorbed at the zeolite.

The physical absorption method is the method of bringing an absorption solution able to dissolve $CO_2$ (for example, methanol or N-methyl pyrrolidone) into contact with gas containing $CO_2$ to physically make the $CO_2$ be absorbed by the absorption solution at a high pressure and low temperature, and of heating the absorption solution (or reducing the pressure of the absorption solution) so as to recover the $CO_2$ from the absorption solution.

If employing the physical absorption method, the $CO_2$ recovery part 21 is, for example, configured as a container containing methanol. By making the gas containing $CO_2$ flow into the methanol contained in this container, $CO_2$ is absorbed at the methanol.

The chemical absorption method is the method of bringing an absorption solution able to selectively dissolve $CO_2$ (for example, an amine or potassium carbonate aqueous solution) into contact with the gas containing $CO_2$ to make the $CO_2$ be absorbed by the absorption solution by a chemical reaction and of heating the absorption solution so as to make the $CO_2$ disassociate from the absorption solution for recovery.

If employing the chemical absorption method, the $CO_2$ recovery part 21 is, for example, configured as a container containing an amine By making the gas containing $CO_2$ flow into the amine contained in this container, $CO_2$ is absorbed at the amine.

In the present embodiment, the $CO_2$ recovery part 21 employing the physical adsorption method as the method of recovery of $CO_2$ in the exhaust is used. Therefore, the $CO_2$ recovery part 21 is configured as a container containing pellet-shaped zeolite.

The suction pump 22 is provided at the exhaust passage 25 communicated with the $CO_2$ recovery part 21. The suction pump 22 is arranged at the downstream side of the $CO_2$ recovery part 21 in the direction of flow of the exhaust gas.

The suction pump 22 is configured so as to use electric power of the battery 50 to suck out gas from the exhaust pipe 13 through the communicating path 24 and forcibly send the gas to the $CO_2$ recovery part 21. Further, the suction pump 22 is configured so as to discharge the sucked gas into the atmosphere. In the present embodiment, the suction pump 22 is, for example, an electric pump configured so that the discharge capacity can be changed steplessly by adjustment of the electric power supplied from the battery 50. If the output of the suction pump 22 becomes greater, the flow rate of gas flowing through the $CO_2$ recovery part 21 becomes greater.

The cooling part 23 is provided at the communicating path 24. The cooling part 23 is communicated with the $CO_2$ recovery part 21 through the communicating path 24. Therefore, the cooling part 23 is arranged at an upstream side of the $CO_2$ recovery part 21 in the direction of flow of the exhaust gas. As a result, the gas cooled at the cooling part 23 flows into the $CO_2$ recovery part 21 through the communicating path 24.

The cooling part 23 is configured to use the electric power of the battery 50 to cool the $CO_2$ recovery part 21. For example, the cooling part 23 is configured to use the electric power of the battery 50 to cool the exhaust gas flowing through the communicating path 24. Specifically, the cooling part 23 is configured to use the electric power of the battery 50 to cool the exhaust gas flowing into the cooling part 23 down to the target temperature and make the cooled exhaust gas flow into the $CO_2$ recovery part 21. The cooling part 23, for example, is configured as a refrigeration circuit provided with a compressor, condenser, expansion valve, and evaporator. At the cooling part 23, a refrigeration cycle is realized by refrigerant circulating through these components. In particular, the evaporator exchanges heat with the exhaust gas flowing through the communicating path 24 directly or indirectly through a medium, and cools such exhaust gas. The refrigerant in the refrigeration circuit falls to a temperature lower than the temperature of the atmosphere, therefore, in the present embodiment, the cooling part 23 can lower the temperature of the exhaust gas flowing into the cooling part 23 to a temperature lower than the temperature of the atmosphere (ordinary temperature).

Note that, the cooling part 23 does not necessarily have to be configured as a refrigeration circuit. The cooling part 23 may be configured in any way so long as able to cool the exhaust gas flowing through the communicating path 24. Therefore, for example, the cooling part 23 may also be configured to have a radiator of the vehicle 1 and to use the cooling solution cooled by the radiator to cool the exhaust gas flowing through the communicating path 24. Further, the cooling part 23 may be configured to be arranged around the $CO_2$ recovery part 21 to cool the $CO_2$ recovery part 21.

Configuration of Control Device

The control device 30 is provided with an ECU 31 configured from a digital computer. Further, the control device 30 is provided with various sensors detecting values of various types of parameters required for controlling the internal combustion engine 10 and $CO_2$ recovery device 20, and an HMI 42 providing information to the user and receiving input from the user. Specifically, the control device 30 is provided with a water temperature sensor 43 and positioning sensor 44 as sensors.

The ECU 31 is provided with a RAM (random access memory), a ROM (read only memory), or other memory, a CPU (microprocessor), an input port, and an output port, which are connected with each other through a bidirectional bus. The input port and output port of the ECU 31 are connected to various actuators and various sensors, etc., of the internal combustion engine 10.

The input port of the ECU 31 is connected to various sensors and the HMI 42, etc. The output signals of various sensors and the HMI 42, etc., are input to the input port. Further, the output port of the ECU 31 outputs control signals to the various actuators of the internal combustion engine 10 and $CO_2$ recovery device 20, and to the HMI 42 etc. Therefore, the various actuators of the internal combustion engine 10, the $CO_2$ recovery device 20, and the HMI 42 are controlled by the ECU 31. The ECU 31 configures the control device of the $CO_2$ recovery device 20 according to the present embodiment.

Figure 2:
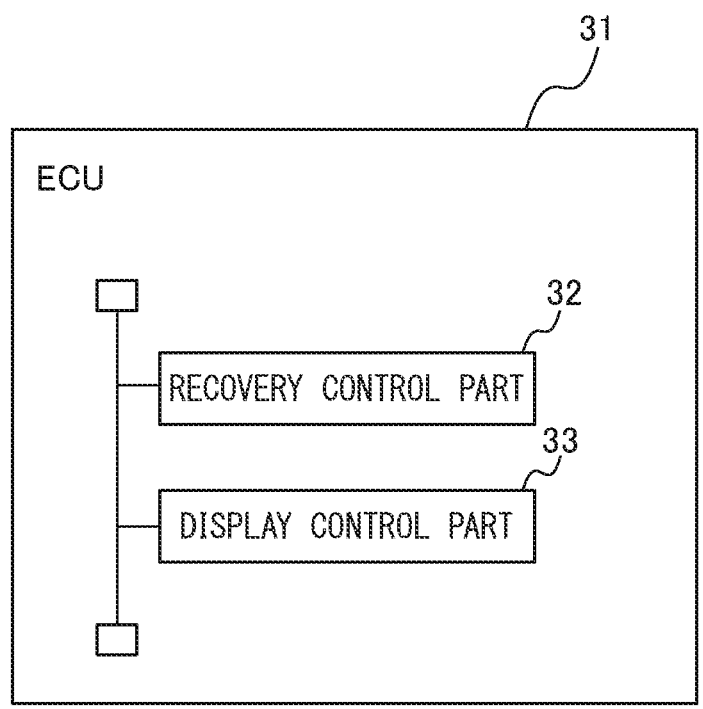
FIG. 2 is a functional block diagram in a CPU of an ECU.

FIG. 2 is a functional block diagram of the ECU 31. As shown in FIG. 2, in the present embodiment, the ECU 31 is provided with the recovery control part 32 and display control part 33 as functional modules. In the present embodiment, the ECU 31 functions as a recovery control part 32 and display control part 33 by running programs stored in the memory, etc.

The recovery control part 32 performs the overall control in the $CO_2$ recovery device 20. For example, the recovery control part 32 can control the discharge capacity and start and stopping of suction at the suction pump 22, and the cooling temperature and start and stopping of cooling at the cooling part 23, etc.

The display control part 33 performs the overall control in the HMI 42. For example, the display control part 33 displays an indicator showing if the $CO_2$ recovery device 20 is operating or stopped, a user interface screen for receiving user input, etc., through the HMI 42.

The HMI 42 is an interface for input and output of information between the user and ECU 31. The HMI 42, for example, is provided with a display for displaying text information or graphic information, a speaker for generating sound, operating buttons or a touch panel for user input operation, and a microphone for receiving voice of a user, etc. Further, the HMI 42 forms a user input part for receiving user input from the user of the vehicle 1 through a user interface screen.

The water temperature sensor 43 is placed at the engine body 11 and detects the temperature of the cooling water (water temperature) cooling the engine body 11. The water temperature sensor 43 is connected to the input port of the ECU 31. The water temperature detected by the water temperature sensor 43 is input to the ECU 31.

The positioning sensor 44 generates positional information showing the current location of the vehicle 1. The positional information generated by the positioning sensor 44 is output to the ECU 31. The positioning sensor 44 is, for example, a GPS (global positioning system) of a car navigation system set in the vehicle 1.

Configuration of Battery

The battery 50 is configured to be able to supply electric power to the suction pump 22 and cooling part 23 of the $CO_2$ recovery device 20, etc. Further, the battery 50 is configured to be able to be charged by output of the internal combustion engine 10, etc.

Summary of Method of Recovery of $CO_2$

Below, the method of recovery of $CO_2$ according to the present embodiment will be explained.

The $CO_2$ recovery part 21 becomes exhaust resistance, therefore the suction pump 22 must be operated so as to make the exhaust gas flow into the $CO_2$ recovery part 21 in order to recover the $CO_2$ in the exhaust gas. Therefore, in the present embodiment, when using the $CO_2$ recovery device 20 to recover $CO_2$, the suction pump 22 is operated.

If the suction pump 22 is operated, part of the exhaust gas flowing through the exhaust pipe 13 flows into the communicating path 24. In the present embodiment, if the suction pump 22 is operated, part of the exhaust gas flowing through the exhaust pipe 13 flows into the cooling part 23. Note that, in the exhaust gas flowing through the exhaust pipe 13, the exhaust gas which did not flow into the communicating path 24 flows through the exhaust pipe 13 as is, and is discharged to the atmosphere.

Further, as explained above, the exhaust gas discharged from the internal combustion engine 10 is a high temperature. On the other hand, the zeolite used as the $CO_2$ adsorbent of the $CO_2$ recovery part 21 makes the adsorbed $CO_2$ desorb when the temperature becomes high. Therefore, if high temperature exhaust gas flows as is into the $CO_2$ recovery part 21, the $CO_2$ recovery part 21 becomes a high temperature. As a result, not only is $CO_2$ not recovered at the $CO_2$ recovery part 21, but also $CO_2$ is desorbed from the $CO_2$ recovery part 21. For this reason, in order for the $CO_2$ recovery part 21 to recover the $CO_2$ in the exhaust gas, it is necessary to cool the exhaust gas flowing into the $CO_2$ (or the $CO_2$ recovery part 21) down to the temperature where $CO_2$ is adsorbed at the zeolite.

Therefore, in the present embodiment, the cooling part 23 is operated when the $CO_2$ recovery device 20 recovers the $CO_2$. If the cooling part 23 is operated, due to the operation of the suction pump 22, the exhaust gas flowing into the cooling part 23 is cooled down to the target temperature. For example, if zeolite is used as the $CO_2$ adsorbent of the $CO_2$ recovery part 21 like in the present embodiment, the target temperature is set to a temperature where $CO_2$ is adsorbed at the zeolite (for example, an ordinary temperature of equal to or less than 30° C.). Therefore, the exhaust gas flowing into the cooling part 23 is cooled down to ordinary temperature or so, at the cooling part 23. As a result, low temperature exhaust gas cooled down to ordinary temperature or so is made to flow to the $CO_2$ recovery part 21. Due to this, the $CO_2$ recovery part 21 is kept from becoming a high temperature and the recovery ability of $CO_2$ at the $CO_2$ recovery part 21 is maintained.

If the exhaust gas cooled at the cooling part 23 flows through the communicating path 24 to the $CO_2$ recovery part 21, the exhaust gas and the $CO_2$ adsorbent of the $CO_2$ recovery part 21 contact. As a result, $CO_2$ is removed from the exhaust gas by adsorption by the $CO_2$ recovery part 21. The exhaust gas after $CO_2$ is removed by adsorption by the $CO_2$ recovery part 21 flows through the exhaust passage 25 and is discharged into the atmosphere.

Note that, in the present embodiment, the cooling part 23 is arranged at the upstream side of the $CO_2$ recovery part 21 in the direction of flow of the exhaust gas and lowers the temperature of the exhaust gas flowing into the $CO_2$ recovery part 21. However, the cooling part 23 can be configured in another way if it can lower the temperature of the $CO_2$ recovery part 21. Therefore, for example, the cooling part 23 may be configured to be arranged around the $CO_2$ recovery part 21 and directly cooling the $CO_2$ recovery part 21.

Problems

In this regard, to operate the suction pump 22 and cooling part 23, that is, to operate the $CO_2$ recovery device 20, the electric power of the battery 50 is used.

On the other hand, as explained above, the battery 50 is charged, for example, by generation of power utilizing the output of the internal combustion engine 10. Therefore, to charge the battery 50, sometimes fuel is burned in the internal combustion engine 10 and accordingly, sometimes $CO_2$ is generated. Therefore, if consuming the electric power of the battery 50, it can be considered that the $CO_2$ is discharged by a corresponding amount.

For this reason, if the $CO_2$ recovery device 20 is operated under poor efficiency of recovery of $CO_2$, sometimes a sufficient amount of recovery of $CO_2$ cannot be obtained with respect to the electric power of the battery 50 consumed by operation of the $CO_2$ recovery device 20. Note that, the efficiency of recovery of $CO_2$ shows the ratio of the amount of recovery of $CO_2$ in the $CO_2$ recovery device 20 with respect to the electric power consumed by the battery 50.

Control of Operation of $CO_2$ Recovery Device

Therefore, in the present embodiment, the control device 30 permits operation of the $CO_2$ recovery device 20 in the case where a high efficiency recovery condition, at which it is predicted that the efficiency of recovery of $CO_2$, showing the ratio of the amount of recovery of $CO_2$ in the $CO_2$ recovery device 20 with respect to the electric power consumed by the battery 50, will become equal to or greater than a preset predetermined efficiency, is satisfied, and prohibits operation of the $CO_2$ recovery device 20 in the case where that high efficiency recovery condition is not satisfied. As a result, a $CO_2$ recovery device with a large amount of recovery of $CO_2$ with respect to the electric power of the battery consumed by the $CO_2$ recovery device (that is, with a high efficiency of recovery of $CO_2$) is provided.

A "high efficiency recovery condition" is a condition at which it is predicted that the efficiency of recovery of $CO_2$ will become equal to or greater than a preset predetermined efficiency. Here, in order to operate the $CO_2$ recovery device 20, relatively large electric power is consumed at the battery 50. For this reason, operation of the $CO_2$ recovery device 20 in a state where a relatively large amount of $CO_2$ recovery is anticipated in the $CO_2$ recovery device 20 is preferable from the viewpoint of improving the balance of the amount of $CO_2$ recovery with respect to the electric power consumed. A "high efficiency recovery condition" means a condition at which a relatively large amount of $CO_2$ recovery with respect to the electric power consumed is anticipated in the $CO_2$ recovery device 20. Below, specific examples of a high efficiency recovery condition will be explained.

A first example of the high efficiency recovery condition is prediction that the vehicle 1 will be driven over equal to or greater than a predetermined reference distance. Therefore, for example, if it is predicted that the vehicle 1 will be driven over equal to or greater than a reference distance, it is judged that the high efficiency recovery condition is satisfied, while if it is predicted that the vehicle 1 will not be driven over equal to or greater than a reference distance, it is judged that the high efficiency recovery condition is not satisfied.

Here, if the cooling part 23 is configured so as to realize a refrigeration cycle, electric power of a certain extent is necessary for starting up the cooling part 23. Therefore, if the vehicle 1 is driven over a short distance less than a certain distance, despite a certain extent of electric power being consumed for starting up the cooling part 23, there is little amount of recovery of $CO_2$ due to the vehicle 1 being driven. From the above, if the vehicle 1 is driven over a short distance, it is predicted that the efficiency of recovery of $CO_2$ will become less than a preset predetermined efficiency. That is, in this case, it is considered that the high efficiency recovery condition is not satisfied.

On the other hand, if the vehicle 1 is driven over a long distance of equal to or greater than a certain set distance, since the driving distance is long, the amount of $CO_2$ recovery at the $CO_2$ recovery device 20 is also great. Therefore, even if electric power is consumed for starting up the cooling part 23, the ratio of the amount of electric power consumed along with startup of the amount of recovery of the $CO_2$ due to the vehicle 1 being driven is small. From the above, in this way, if the vehicle 1 is driven over a short distance, it is predicted that the efficiency of recovery of $CO_2$ will become equal to or greater than a preset predetermined efficiency. That is, in this case, it is considered that the high efficiency recovery condition is satisfied.

Specifically, if the predicted driving distance until the destination input to the car navigation system of the vehicle 1 (not shown) is equal to or greater than the reference distance, it is predicted that the vehicle will be driven over a long distance of equal to or greater than a certain set distance. For this reason, in this case, the recovery control part 32 predicts that the efficiency of recovery of $CO_2$ will become equal to or greater than a predetermined efficiency, and judges that the high efficiency recovery condition is satisfied. On the other hand, if the predicted driving distance until the destination is less than a reference distance, it is predicted that the vehicle will be driven over a short distance of less than a certain set distance. For this reason, the recovery control part 32 predicts that the efficiency of recovery of $CO_2$ will not become equal to or greater than a predetermined efficiency, and judges that the high efficiency recovery condition is not satisfied. Note that, the reference distance is, for example, set to a distance at which a greater amount of recovery of $CO_2$ is anticipated than the amount of generation of $CO_2$ due to generation of power corresponding to the amount of electric power consumed in the $CO_2$ recovery device 20 at the internal combustion engine 10 if the vehicle 1 is driven by equal to or greater than the reference distance.

A second example of the high efficiency recovery condition is that a predetermined reference time has elapsed from startup of the internal combustion engine 10 of the vehicle 1. Therefore, for example, if the reference time has elapsed from startup of the internal combustion engine 10 of the vehicle 1, it is judged that the high efficiency recovery condition is satisfied, while if the reference time has not elapsed from startup of the internal combustion engine 10 of the vehicle 1, it is judged that the high efficiency recovery condition is not satisfied.

As explained above, if the vehicle is driven over a long distance, the efficiency of recovery of the $CO_2$ is high, while if the vehicle is driven over a short distance, the efficiency of recovery of the $CO_2$ is low. Here, the frequency by which the vehicle 1 is driven over a long distance and the frequency by which it is driven over a short distance differ for each user of the vehicle 1. Therefore, for example, in a vehicle 1 with a high frequency of being driven by a user over a long distance, at an early stage after startup of the internal combustion engine 10, it can be judged that the possibility of being driven over a long distance is high. Accordingly, in this case, if a short time elapses after startup of the internal combustion engine 10, it can be predicted that the vehicle 1 will be driven over a long distance and accordingly can be judged that the high efficiency recovery condition is satisfied. On the other hand, if the frequency by which the vehicle 1 is driven over a short distance is high, it is only after the elapse of a time of equal to or greater than the driving time in the frequently performed short distance driving that the possibility of being driven over a long distance becomes higher. Therefore, in this case, if a relatively long time has elapsed after startup of the internal combustion engine 10, it is predicted that the vehicle 1 will be driven over a long distance and accordingly it is judged that the high efficiency recovery condition is satisfied.

Therefore, in the second example, it is judged whether the high efficiency recovery condition is satisfied based on whether the time elapsed from startup of the internal combustion engine 10 is over a reference time set for each user. At this time, the reference time for judging the high efficiency recovery condition is set based on the past history of the vehicle 1. Specifically, the reference time is, for example, set to a minimum time at which the possibility of the vehicle 1 being driven for a long distance of equal to or greater than a reference distance is equal to or greater than a certain ratio, from the past history. Note that, the reference time may, for example, be set manually by the user or otherwise set by another method.

A third example of the high efficiency recovery condition is the water temperature of the internal combustion engine 10 of the vehicle 1 being equal to or greater than a predetermined reference temperature. Therefore, for example, if the water temperature of the internal combustion engine 10 of the vehicle 1 is equal to or greater than the reference temperature, it is judged that the high efficiency recovery condition is satisfied, while if the water temperature of the internal combustion engine 10 is lower than a predetermined temperature, it is judged that the high efficiency recovery condition is not satisfied.

As explained above, it is possible to predict if the vehicle 1 will be driven over a long distance or will be driven over a short distance, based on the time elapsed from startup of the internal combustion engine 10. On the other hand, the water temperature of the internal combustion engine 10 changes in accordance with the time elapsed from cold start of the internal combustion engine 10. The water temperature becomes higher, as the elapsed time from cold start becomes longer. Therefore, it is possible to judge if the vehicle is being driven over a long distance, based on whether the water temperature of the internal combustion engine 10 is exceeding the reference temperature set for each user.

Therefore, in the third example, it is judged whether the high efficiency recovery condition is satisfied, based on whether the water temperature of the internal combustion engine 10 is over the reference temperature set for each user. At this time, the reference temperature for judging the high efficiency recovery condition is set based on the past history of the vehicle 1. Specifically, the reference temperature is, for example, set to a minimum temperature at which the possibility of the vehicle 1 being driven over a long distance of equal to or greater than a reference distance is equal to or greater than a certain ratio from the past history.

Above, examples of the high efficiency recovery conditions were explained, but the high efficiency recovery conditions are not limited to these examples. Various conditions may be included in accordance with the objective, application, etc.

Note that, when the reference distance, reference water temperature, reference time, etc. in the high efficiency recovery condition are set manually by the user, these are set for example through the HMI 42. In this case, for example, the display control part 33 may also display a user interface for setting the values of the high efficiency recovery condition through the HMI 42. The user of the vehicle 1 can set the values of the high efficiency recovery condition through the user interface.

Flow Chart

Figure 3:
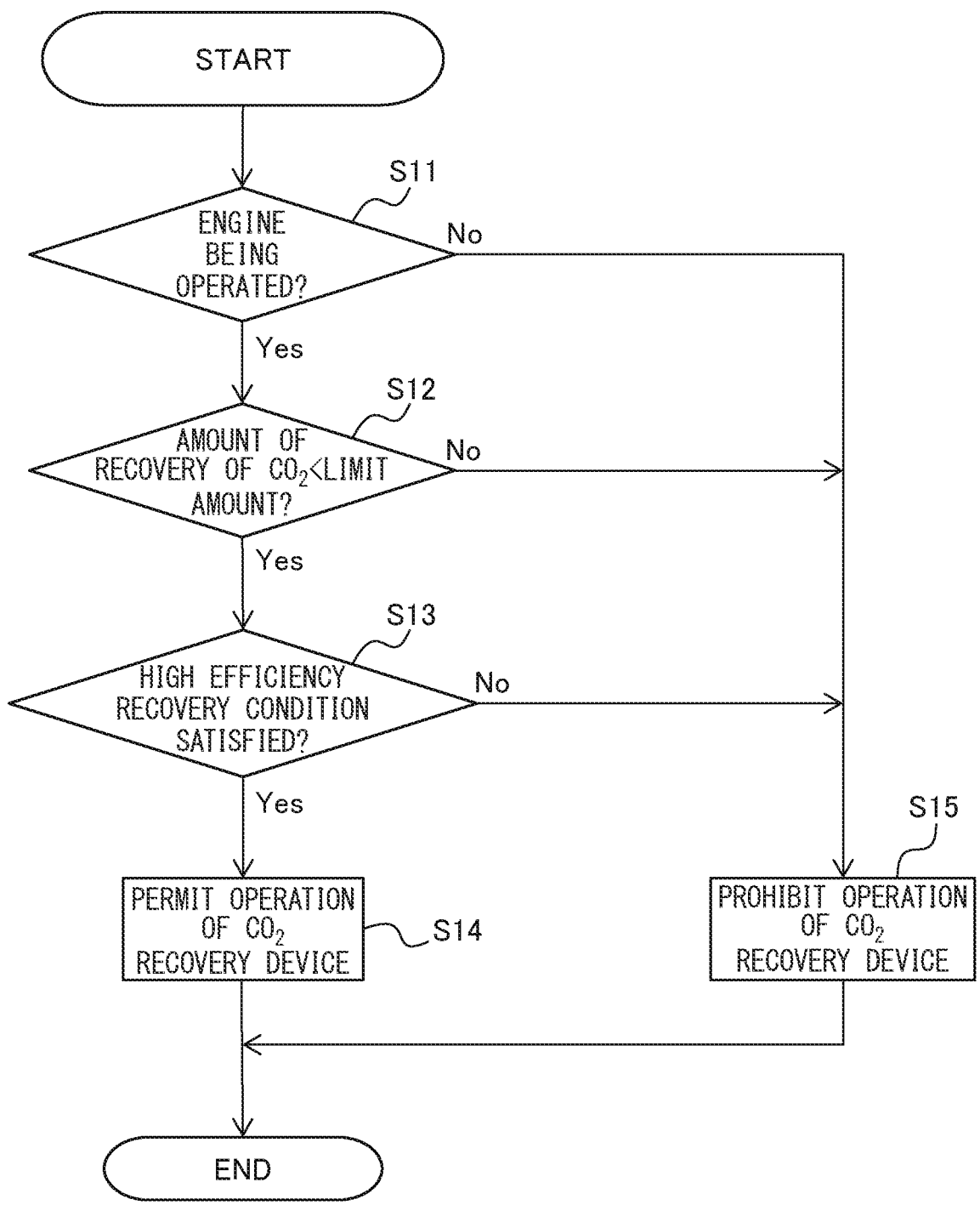
FIG. 3 is a flow chart showing a control routine performed at a recovery control part.

FIG. 3 is a flow chart showing the control routine performed by the recovery control part 32 of the ECU 31 according to the present embodiment. The illustrated control routine is performed at constant time intervals.

First, at step S11, it is judged if the internal combustion engine 10 is being operated. If it is judged that the internal combustion engine 10 is not being operated, exhaust gas cannot flow into the $CO_2$ recovery device 20, therefore the control routine proceeds to step S15 where the operation of the $CO_2$ recovery device 20 is prohibited. On the other hand, if at step S11 it is judged that the internal combustion engine 10 is being operated, the control routine proceeds to step S12.

At step S12, it is judged if the amount of recovery of $CO_2$ at the $CO_2$ recovery device 20 is smaller than the limit amount which can be recovered at the $CO_2$ recovery device 20. The amount of recovery of $CO_2$ at the $CO_2$ recovery device 20 is, for example, calculated based on the amount of supply of fuel to the internal combustion engine 10 and the amount of supply of exhaust gas to the $CO_2$ recovery device 20. The amount of supply of exhaust gas to the $CO_2$ recovery device 20 is, for example, calculated based on the engine rotational speed and the electric power supplied to the suction pump 22. Note that, the amount of recovery of $CO_2$ at the $CO_2$ recovery device 20 may be calculated based on the concentration of $CO_2$ detected by the $CO_2$ concentration sensor (not shown) provided at the upstream side of the $CO_2$ recovery device 20 and the amount of supply of exhaust gas to the $CO_2$ recovery device 20.

If at step S12 it is judged that the amount of recovery of $CO_2$ at the $CO_2$ recovery device 20 is equal to or greater than the limit amount, the $CO_2$ recovery device 20 cannot recover $CO_2$ any more, therefore the control routine proceeds to step S15 where the operation of the $CO_2$ recovery device 20 is prohibited. On the other hand, if at step S12 it is judged that the amount of recovery of $CO_2$ at the $CO_2$ recovery device 20 is less than the limit amount, the control routine proceeds to step S13.

At step S13, it is judged if the high efficiency recovery condition is satisfied. Specifically, the recovery control part 32 judges that the high efficiency recovery condition is satisfied if the predicted driving distance to the destination input to the navigation system is equal to or greater than a reference distance. Further, the recovery control part 32 judges that the high efficiency recovery condition has been satisfied if the time elapsed from startup of the internal combustion engine 10 is equal to or greater than a reference time. Alternatively, the recovery control part 32 judges that the high efficiency recovery condition has been satisfied if the water temperature detected by the water temperature sensor 43 after cold startup of the internal combustion engine 10 becomes equal to or greater than the reference temperature. Note that, at step S13, the recovery control part 32 may judge that the high efficiency recovery condition has been satisfied when any two conditions among these conditions (for example, the predicted driving distance is equal to or greater than the reference distance and the time elapsed from startup of the internal combustion engine 10 is equal to or greater than the reference time) or all three of the conditions have been satisfied.

If at step S13 it is judged that the high efficiency recovery condition is satisfied, the control routine proceeds to step S14. At step S14, operation of the $CO_2$ recovery device 20 is permitted and the control routine is ended.

In the present embodiment, when at step S14 the operation of the $CO_2$ recovery device 20 is permitted, the $CO_2$ recovery device 20 is operated and accordingly the suction pump 22 and cooling part 23 are operated. On the other hand, when at step S15 the operation of the $CO_2$ recovery device 20 is prohibited, the $CO_2$ recovery device 20 is stopped and accordingly the suction pump 22 and cooling part 23 are stopped.

Note that, after step S14, the display control part 33 may display an indicator showing that the $CO_2$ recovery device 20 is operating, through the HMI 42. Similarly, after step S15, the display control part 33 may display an indicator showing that the $CO_2$ recovery device 20 has stopped, through the HMI 42.

Further, for example, the user input part (that is, the HMI 42), may receive an operation prohibit instruction prohibiting operation of the $CO_2$ recovery device 20 input by the user through a user interface. In this case, for example, the recovery control part 32 may prohibit operation of the $CO_2$ recovery device 20 even when the high efficiency recovery condition is satisfied, if the user input part (that is, HMI 42) receives this operation prohibit instruction.

Second Embodiment

Next, a control device of a vehicle according to the second embodiment will be explained. The configuration of the control device of a vehicle according to the second embodiment is basically similar to the configuration of the control device of a vehicle according to the first embodiment. Below, the parts different from the configuration of the control device of a vehicle according to first embodiment will be focused on in the explanation.

Configuration of Vehicle

Figure 4:
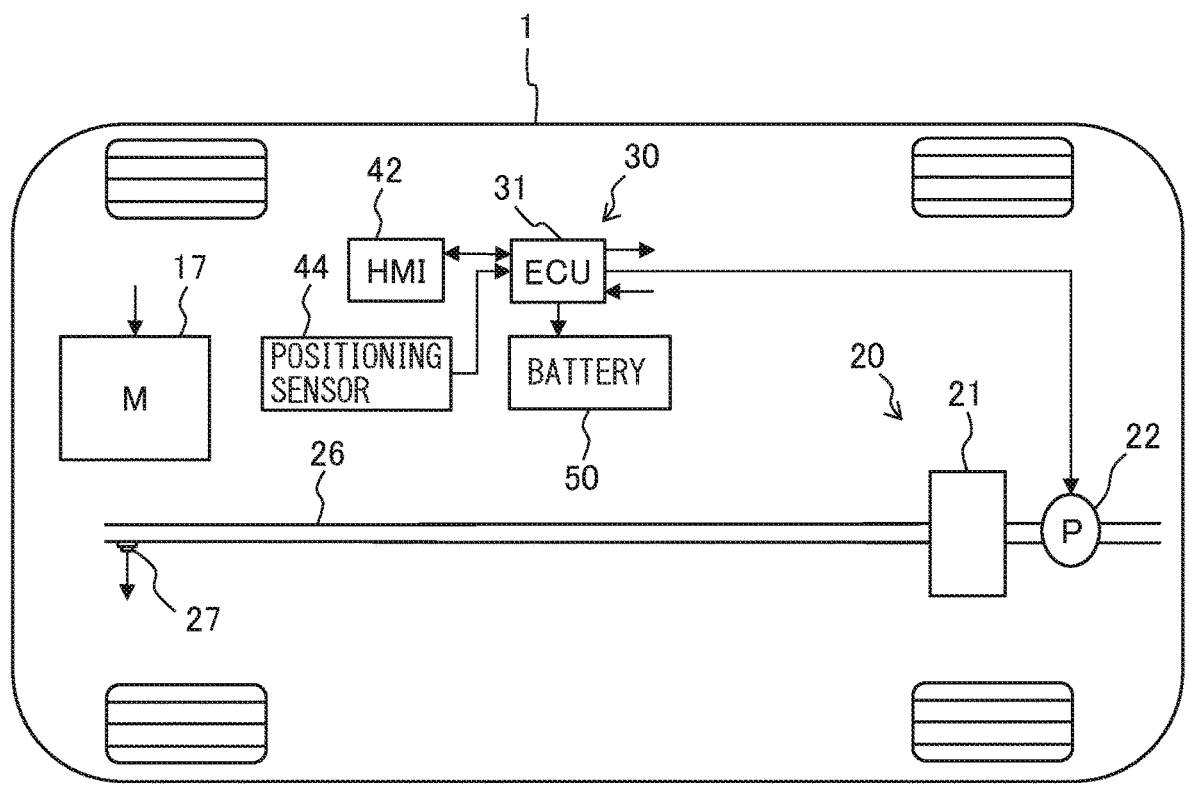
FIG. 4 is a view schematically showing the configuration of the vehicle.

FIG. 4 is a view schematically slowing the configuration of the vehicle 1 according to the present embodiment. As shown in FIG. 4, in the vehicle 1 according to the second embodiment, as the source of power driving the vehicle 1, the motor 17 is used instead of the internal combustion engine 10 in the first embodiment. The motor 17 uses the electric power of the battery to generate drive force for driving the vehicle 1.

As shown in FIG. 4, in the present embodiment, the $CO_2$ recovery device 20 is configured so as to recover the $CO_2$ in the air outside of the vehicle. The $CO_2$ recovery device 20 includes a $CO_2$ recovery part 21, suction pump 22, and outside connection passage 26. The $CO_2$ recovery device 20 communicates with the outside of the vehicle through the outside connection passage 26.

The outside connection passage 26 extends in the front-back direction of the vehicle 1 beneath the underbody of the vehicle 1. In particular, in the present embodiment, the inlet of the outside connection passage 26 is arranged in the motor compartment. Further, the $CO_2$ recovery part 21 is provided at the outside connection passage 26. Therefore, the outside connection passage 26 is configured so as to be able to make the air at the outside of the vehicle 1 flow from the outside of the vehicle 1 into the $CO_2$ recovery part 21. Furthermore, the outside connection passage 26 is configured to discharge the air after recovery of $CO_2$ by the $CO_2$ recovery part 21 to the outside of the vehicle. Note that, if possible to make the air around the vehicle 1 flow through the outside connection passage 26 into the $CO_2$ recovery part 21, the outside connection passage 26 may be configured in any way. Therefore, for example, the inlet of the outside connection passage 26 may be arranged at a side surface of the vehicle 1 (surface of vehicle 1 extending in front-back direction).

The suction pump 22 is provided at the outside connection passage 26 communicated with the $CO_2$ recovery part 21. In the present embodiment, the suction pump 22 is arranged at the downstream side of the $CO_2$ recovery part 21 in the direction of flow of gas at the outside connection passage 26. The suction pump 22 is configured to use the electric power of the battery 50 to suck in gas from the outside of the vehicle and forcibly send it to the $CO_2$ recovery part 21.

As shown in FIG. 4, the $CO_2$ recovery device 20 is provided with a $CO_2$ concentration sensor 27 detecting the concentration of $CO_2$ in the air around the vehicle 1. In the present embodiment, the $CO_2$ concentration sensor 27 is arranged near the inlet of the outside connection passage 26. The $CO_2$ concentration sensor 27 is connected to the ECU 31 and outputs its measurement value to the ECU 31. Note that, the $CO_2$ concentration sensor 27 may also be arranged at a location other than the outside connection passage 26 so long as able to detect the concentration of $CO_2$ in the air around the vehicle 1.

Note that, in the present embodiment, the $CO_2$ recovery device 20 does not have a cooling part such as used in the first embodiment. This is because in the present embodiment, air at the outside of the vehicle flows into the $CO_2$ recovery part 21, and the air at the outside of the vehicle basically does not become high enough in temperature so as to cause desorption of $CO_2$ at the $CO_2$ recovery part 21.

Summary of Method of Recovery of $CO_2$

Next, the method of recovery of $CO_2$ according to the present embodiment will be explained. In the present embodiment, in the $CO_2$ recovery device 20, if the $CO_2$ recovery device 20 is operated (that is, the suction pump 22 is operated), air outside the vehicle flows through the outside connection passage 26. Note that, even if the suction pump 22 is not being operated, if the vehicle 1 is being driven, air at the outside of the vehicle flows through the outside connection passage 26 due to the running wind. If air outside of the vehicle flows through the outside connection passage 26 and into the $CO_2$ recovery part 21, the $CO_2$ adsorbent of the $CO_2$ recovery part 21 and the inflowing air contact each other. As a result, the $CO_2$ recovery part 21 adsorbs and removes the $CO_2$ from the air whereby the $CO_2$ in the air is recovered by the $CO_2$ recovery part 21. The air after the $CO_2$ is recovered by the $CO_2$ recovery part 21 flows through the outside connection passage 26 and is discharged to the outside of the vehicle.

Control of Operation of $CO_2$ Recovery Device

In this regard, in order to operate the suction pump 22, that is, to operate the $CO_2$ recovery device 20, electric power of the battery 50 is used. For this reason, if the $CO_2$ recovery device 20 is operated when the concentration of $CO_2$ in the air around the vehicle 1 is low, that is, when the efficiency of recovery of $CO_2$ at the $CO_2$ recovery device 20 is low, a sufficient amount of recovery of $CO_2$ is not obtained with respect to the electric power of the battery 50 consumed by operation of the $CO_2$ recovery device 20.

Therefore, in the present embodiment as well, the control device 30 permits operation of the $CO_2$ recovery device 20 when a high efficiency recovery condition, at which the efficiency of recovery of $CO_2$ showing a ratio of the amount of recovery of $CO_2$ at the $CO_2$ recovery device 20 with respect to the electric power consumed by the battery 50 is equal to or greater than a preset predetermined efficiency, ¥ is satisfied, and prohibits operation of the $CO_2$ recovery device 20 when the high efficiency recovery condition is not satisfied. As a result, in the present embodiment as well, a $CO_2$ recovery device with a larger amount of recovery of $CO_2$ with respect to the electric power of the battery consumed by the $CO_2$ recovery device (that is, with a higher efficiency of recovery of $CO_2$) is provided.

In the present embodiment, the high efficiency recovery condition is that, for example, the concentration of $CO_2$ in the air around the vehicle 1 is equal to or greater than a predetermined threshold value. Therefore, for example, if the concentration of $CO_2$ in the air around the vehicle 1 is equal to or greater than a predetermined threshold value, it is judged that the high efficiency recovery condition has been satisfied, while if the concentration of $CO_2$ in the air around the vehicle 1 is lower than a predetermined threshold value, it is judged that the high efficiency recovery condition has not been satisfied.

For example, in a region with a low $CO_2$ concentration, the amount of recovery of $CO_2$ in the $CO_2$ recovery device 20 is relatively small compared to the electric power consumed by operation of the $CO_2$ recovery device 20 (that is, the operation of the suction pump 22). Therefore, if the concentration of $CO_2$ contained in the gas flowing into the $CO_2$ recovery part 21 is not equal to or greater than a predetermined threshold value, it is predicted that the efficiency of recovery of $CO_2$ will not become equal to or greater than a preset predetermined efficiency.

On the other hand, in the region of a high $CO_2$ concentration, the amount of recovery of $CO_2$ in the $CO_2$ recovery device 20 is relatively large compared to the electric power consumed by operation of the $CO_2$ recovery device 20. Therefore, if the concentration of $CO_2$ contained in the gas flowing into the $CO_2$ recovery part 21 is equal to or greater than a predetermined threshold value, it is predicted that the efficiency of recovery of $CO_2$ will become equal to or greater than a preset predetermined efficiency.

Others

Above, preferred embodiments according to the present disclosure were explained. However, the present disclosure is not limited to these embodiments and can be corrected and changed in various ways within the scope of the claims.

The invention claimed is:

1. A control device mounted in a vehicle including a battery and a $CO_2$ recovery device configured to use electric power of the battery to recover $CO_2$ contained in gas flowing into the $CO_2$ device, the control device being programmed to:
   control the $CO_2$ recovery device, including:
   operate the $CO_2$ recovery device under a high efficiency recovery condition, wherein it is predicted that an efficiency of recovery of $CO_2$, measured as a ratio of the amount of recovery of $CO_2$ in the $CO_2$ recovery device with respect to the electric power consumed by the battery, will become equal to or greater than a preset predetermined efficiency, and
   prohibit operation of the $CO_2$ recovery device in the case where the high efficiency recovery condition is not satisfied.

2. The control device according to claim 1, wherein
   the gas flowing into the $CO_2$ recovery device is a gas discharged from an internal combustion engine mounted in the vehicle,
   the $CO_2$ recovery device includes:

a $CO_2$ recovery part configured to recover $CO_2$ in the gas flowing into the $CO_2$ recovery device;

a cooling part configured to use the electric power of the battery to cool the $CO_2$ recovery part; and a suction pump configured to use the electric power of the battery to suck in the gas and make the gas flow to the $CO_2$ recovery part, and the control device is configured to operate the cooling part and the suction pump when the high efficiency recovery condition is satisfied, and prohibit operations of the cooling part and the suction pump when the high efficiency recovery condition is not satisfied.

3. The control device according to claim 1, wherein the control device is programmed to:

operate the $CO_2$ recovery device under the high efficiency recovery condition when it is predicted that the vehicle will be driven a predetermined distance or more; and prohibit the operation of the $CO_2$ recovery device when the high efficiency recovery condition is not satisfied, and it is predicted that the vehicle will not be driven a predetermined distance or more.

4. The control device according to claim 1, wherein the control device is programmed to:

operate the $CO_2$ recovery device under the high efficiency recovery condition when a water temperature of the internal combustion engine of the vehicle is equal to or greater than a predetermined temperature; and prohibit the operation of the $CO_2$ recovery device when the high efficiency recovery condition is not satisfied, and the water temperature is lower than the predetermined temperature.

5. The control device according to claim 1, wherein the control device is programmed to:

operate the $CO_2$ recovery device under the high efficiency recovery condition when a predetermined time has elapsed from cold start of the internal combustion engine of the vehicle; and prohibit the operation of the $CO_2$ recovery device when the high efficiency recovery condition is not satisfied, and the predetermined time has not elapsed from cold start.

6. The control device according to claim 1, wherein the gas flowing into the $CO_2$ recovery device is air around the vehicle, the $CO_2$ recovery device includes:

a $CO_2$ recovery part configured to recover $CO_2$ in the gas flowing into the $CO_2$ recovery device; and a suction pump configured to use the electric power of the battery to suck in the gas and make the gas flow to the $CO_2$ recovery part, and the control device being programmed to:

operate the $CO_2$ recovery device under the high efficiency recovery condition when a concentration of $CO_2$ contained in the air around the vehicle is equal to or greater than a predetermined threshold value; and prohibit the operation of the $CO_2$ recovery device when the high efficiency recovery condition is not satisfied and the concentration of $CO_2$ is lower than the predetermined threshold value.

7. The control device according to claim 1, wherein the vehicle further includes a user interface screen configured for receiving an operation prohibit instruction for prohibiting the operation, from a user of the vehicle, and the control part is programmed to prohibit the operation even when the high efficiency recovery condition is satisfied, when the user interface screen receives the operation prohibit instruction.

\* \* \* \* \*